United States Patent
Dersch et al.

(10) Patent No.: US 11,340,600 B2
(45) Date of Patent: May 24, 2022

(54) METHOD FOR OPERATING A PACKAGING MACHINE

(71) Applicant: ROVEMA GMBH, Fernwald (DE)

(72) Inventors: Volker Dersch, Gruenberg (DE); Peter Trepke, Romrod (DE)

(73) Assignee: ROVEMA GMBH, Fernwald (DE)

( * ) Notice: Subject to any disclaimer, the term of this patent is extended or adjusted under 35 U.S.C. 154(b) by 129 days.

(21) Appl. No.: 16/962,924

(22) PCT Filed: Jan. 9, 2019

(86) PCT No.: PCT/EP2019/050447
§ 371 (c)(1),
(2) Date: Jul. 17, 2020

(87) PCT Pub. No.: WO2019/141566
PCT Pub. Date: Jul. 25, 2019

(65) Prior Publication Data
US 2021/0141370 A1     May 13, 2021

(30) Foreign Application Priority Data
Jan. 19, 2018  (DE) .................. 10 2018 101 180.6

(51) Int. Cl.
*B65B 57/14*     (2006.01)
*B65B 57/18*     (2006.01)
(Continued)

(52) U.S. Cl.
CPC .......... *G05B 23/0235* (2013.01); *B65B 57/14* (2013.01); *B65B 57/16* (2013.01);
(Continued)

(58) Field of Classification Search
CPC ........... B65B 1/12; B65B 37/10; B65B 57/14; B65B 57/145; B65B 57/16; B65B 57/18;
(Continued)

(56) References Cited

U.S. PATENT DOCUMENTS 3,616,968 A * 11/1971 James et al. ............ B65B 37/10
                                                                     222/643
5,568,028 A * 10/1996 Uchiyama et al. ........................
                                                                G05B 19/4065
                                                                     318/434
(Continued)

FOREIGN PATENT DOCUMENTS

DE      102010028697 B3    11/2011
DE      102013207363 A1 * 10/2014  ............... B65B 1/12
(Continued)

*Primary Examiner* — Stephen F. Gerrity
(74) *Attorney, Agent, or Firm* — Dickinson Wright PLLC; Andrew D. Dorisio

(57) ABSTRACT

A method for operating a packaging machine having at least one electric drive motor, the drive motor driving at least one functional unit of the packaging machine in a program-controlled manner when producing packaging using the following steps: (a) loading a parameter set into the control of the packaging machine, the parameter set containing at least one load parameter which limits the torque or the current consumption of the drive motor to a maximum when producing packaging; (b) operating the packaging machine for producing packaging, the maximally occurring actual value of the torque mustered at the drive motor or the current consumed by the drive motor being measured during operation; (c) determining a new load parameter as a function of the maximum actual value; (d) saving the new load parameter in a parameter set allocated to the packaging to be produced.

9 Claims, 2 Drawing Sheets

(51) Int. Cl.
    *B65B 57/16*     (2006.01)
    *B65B 37/10*     (2006.01)
    *G05B 23/02*     (2006.01)
    *G05B 19/042*     (2006.01)
    *H02P 29/032*     (2016.01)

(52) U.S. Cl.
    CPC ............ B65B 57/18 (2013.01); *G05B 19/042*
    (2013.01); *H02P 29/032* (2016.02); *B65B*
    *37/10* (2013.01); *B65B 57/145* (2013.01);
    *G05B 2219/45048* (2013.01)

(58) Field of Classification Search
    CPC ....... B65B 59/001; B65B 59/02; B65B 65/02;
    G05B 2219/45048
    USPC ...................................... 53/52, 493; 318/434
    See application file for complete search history.

(56) References Cited

U.S. PATENT DOCUMENTS

| | | |
|---|---|---|
| 5,587,931 A | 12/1996 | Jones et al. |
| 5,836,136 A | 11/1998 | Highberger |
| 10,948,894 B2 * | 3/2021 | Brambach et al. ........................ G05B 19/4065 |
| 2008/0218112 A1 * | 9/2008 | Beifus et al. ........... H02P 29/02 318/490 |
| 2008/0272725 A1 * | 11/2008 | Bojrup et al. ...... H02P 23/0004 318/434 |
| 2009/0033265 A1 * | 2/2009 | Fleischmann et al. . H02P 29/02 318/434 |
| 2010/0060225 A1 * | 3/2010 | Kosaka ................. H02P 29/032 318/566 |
| 2013/0186515 A1 * | 7/2013 | Kleiner et al. ............ B65B 1/12 141/12 |
| 2016/0114923 A1 | 4/2016 | Kiyota |
| 2017/0139391 A1 * | 5/2017 | Yamamoto ......... G05B 19/0428 |

FOREIGN PATENT DOCUMENTS

| | | |
|---|---|---|
| DE | 102013207363 A1 | 10/2014 |
| DE | 102016208670 A1 | 11/2017 |
| EP | 0661212 A1 | 7/1995 |
| EP | 1757522 A1 | 2/2007 |
| EP | 1168591 B1 | 6/2011 |
| EP | 3046250 A1 | 7/2016 |
| JP | 2007028865 A | 2/2007 |
| WO | 9640558 A1 | 12/1996 |

* cited by examiner

METHOD FOR OPERATING A PACKAGING MACHINE

TECHNICAL FIELD

The invention relates to a method for operating a packaging machine.

BACKGROUND OF THE INVENTION

DE 10 2010 028 697 A1, for example, discloses a generic packaging machine. This packaging machine comprises in particular a drive motor by means of which a functional unit, namely a screw conveyor, can be driven. With generic packaging machines, a parameter set having a load parameter is stored in the control, the load parameter limiting the torque which can be maximally exerted by the motor and the current which can be maximally consumed by the drive motor. The load parameter prevents the drive motor from becoming overloaded, as could happen when the screw conveyor becomes blocked, for example.

A problem of the known packaging machines is that different kinds of packaging are produced using the packaging machines. Depending on the corresponding packaging to be produced, the functional unit driven by the drive motor can be retrofitted. Should, for instance, smaller packaging be filled and sealed, the corresponding screw conveyor of a smaller size is installed. This can be problematic since the load parameter which limits the maximum current consumption and the maximum torque of the corresponding drive motor remains unchanged. Should a functional error arise at the functional unit, for instance due to packaging of the powder to be conveyed by the screw conveyor, then the limit of the output to be generated by the drive motor as programmed with the load parameter is not reached until after considerable damage has already been done to the corresponding functional unit, e.g. by the corresponding small screw conveyor becoming unscrewed.

SUMMARY OF THE INVENTION

Starting from this state of the art, it is the object of the invention at hand to propose a new method for operating a packaging machine by means of which the disadvantages described above are avoided.

Advantageous embodiments of the invention are the subject matter of the dependent claims.

With the method according to the invention, a parameter set having a load parameter is first loaded as commonly practiced, the load parameter limiting the torque or the current consumption of the motor to a predefined maximum when producing a specific packaging. This predefined maximum of the performance capacity which is represented by the load parameter can be configured specifically to prevent the drive motor from becoming overloaded.

Subsequently, the packaging machine is put into operation and the corresponding packaging is produced using the corresponding required functional units of the packaging machine. While the packaging machine is in operation for producing the packaging, the maximally occurring actual value of the torque mustered at the motor and the maximally occurring actual value of the current consumed at the motor is measured. If the packaging is a correspondingly small packaging, this maximally occurring actual value typically lies far below the hitherto set load parameter.

In the next step, a new load parameter is calculated from the measured actual value of the maximally mustered torque or the maximally consumed current. This new load parameter represents precisely the limit of the performance capacity of the drive motor which has to be mustered during the fault-free normal operation of the packaging machine when producing the corresponding packaging. Naturally, the new load parameter can then be set slightly above the measured actual value to avoid undesired error messages when exceeding a too narrow load parameter.

Lastly, the new load parameter which is derived from the measured actual value of the maximally mustered torques and/or the maximally consumed current is saved in a parameter set allocated specifically to the packaging to be produced. During further operation of the packaging machine, the specifically allocated parameter set can always be loaded into the control of the packaging machine whenever a corresponding packaging is to be produced using the packaging machine, thereby easily precluding damage not only to the drive motor but also to the functional unit driven by the drive motor.

The maximum current consumed during production of packaging or the maximum torque mustered during production of a packaging unit can fluctuate within certain tolerance thresholds. In order to be able to take such fluctuations into account when determining the new load parameter, it is particularly advantageous if the new load parameter is determined after a predefined minimum number of packaging has been produced and after the arisen maximum actual value has been measured correspondingly. An average from the different maximum actual values can be used for determining the new load parameter. Alternatively thereto, it is also possible to use the largest of the measured maximum actual values for determining the new load parameter.

Different approaches are viable for the continued use of the new load parameter. According to a first method variation, the old load parameter is automatically overwritten after a new load parameter for a specific packaging has been determined.

Alternatively to automatically overwriting the old load parameter, the use of the new load parameter can be tied to the user first affirming a corresponding message before the old load parameter is overwritten with the new load parameter.

It is of generally no importance in which manner the new load parameter is determined as a function of the measured actual value. Known calculating formulas can be easily used therefor. A particularly simple and easily understandable calculating formula is found in the use of a linear formula F (new load parameter)=f (maximum actual value).

According to a preferred embodiment variation, it is intended to calculate the new load parameter as a percentage of the maximally measured actual value. Preferably, the new load parameter can be 110% or 120% or 130% or 140% or 150% of the maximally measured actual value.

If the newly saved load parameter is exceeded during production of packaging, different reactions can be triggered. According to one variation, a warning is issued when a first load parameter is exceeded. If the measured actual value exceeds a load parameter of 110%, for example, of the maximum actual value measured according to the invention, then a warning is displayed to the user indicating a potential problem due to the increased load.

According to a second method alternative, it is intended to issue an error message when a second load parameter, for example of 130% of the maximum actual value measured using the method according to the invention, is exceeded.

According to a third method alternative, if the fourth load parameter, for example of 150% of the maximum actual value measured using the method according to the invention, is exceeded, an emergency shutdown signal can be issued to automatically shut down the machine and thus prevent damage to the mechanical functional units due to undesired overloads.

BRIEF DESCRIPTION OF THE DRAWING FIGURES

An embodiment of the invention is schematically illustrated in the drawings and is described in an exemplary manner in the following.

In the figures.

DETAILED DESCRIPTION OF THE INVENTION

Figure 1:
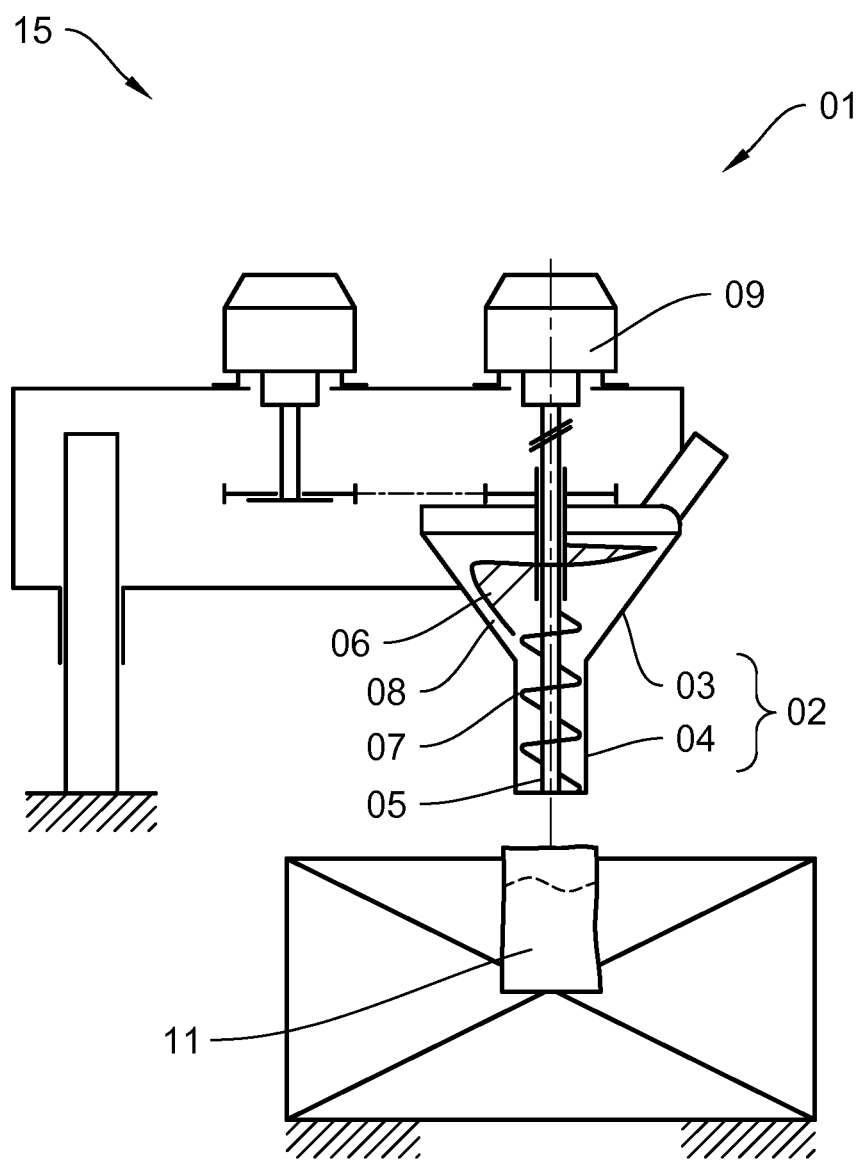
FIG. 1 shows a schematically illustrated packaging machine having a screw conveyor driven by a drive motor.

A metering device 01 is sketched in FIG. 1 which is part of a packaging machine 15. In this instance, dosage device 01 comprises an output container 02 which consists of a funnel 03 and a tube 04 connected thereto. Attached thereto is a stirrer 06 and a metering screw 05. As can be seen in the sketch, funnel 03, tube 04, stirrer 06 and metering screw 05 share a middle axis.

A gap 08 is provided between stirrer 06 and funnel 03. From a functional viewpoint, gap 08 is as small as possible though large enough to prevent contact between stirrer 06 and funnel 03. The same principle applies to gap 07 between tube 04 and metering screw 05.

Nevertheless, collision of the corresponding parts cannot be precluded by means of a small gap 07 or 08.

Screw conveyor 05 is driven by a drive motor 09. For drive motor 09, a load parameter 10 (cf. FIG. 2) which is to prevent damage to drive motor 09 due to overload is stored in the control of packaging machine 15.

Figure 2:
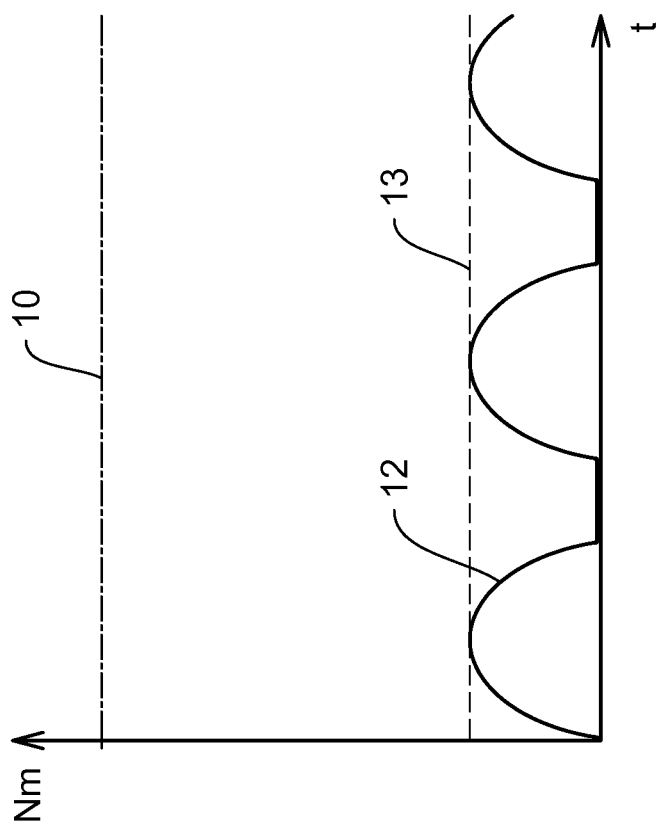
FIG. 2 shows a schematically illustrated measurement diagram for displaying the measured actual torque of the drive motor.

FIG. 2 shows the measurement diagram for measuring the torque which is mustered by drive motor 09 and acts on screw conveyor 05 during production of packaging 11. Actual value 12 of the torque to be attained during production of packaging 11 rises periodically to a maximum value 13 and then drops back to zero. With each new packaging 11, a new value cycle of the torque mustered at screw conveyor 05 is run through.

It is obvious that maximum actual value 13 of the torque mustered by drive motor 09 is far below load parameter 10 saved in the control. If actual torque 12 were to exceed maximum value 13 attained during normal operation during a fault, such as when the powder to be conveyed is packaged, then a fault would not be recognized by the control until load parameter 10 has been reached, though massive mechanical damage will have already been done to the screw conveyor in this instance.

In order to preclude such damage, actual value 13 measured during normal operation is used for determining a new load parameter 14.

Figure 3:
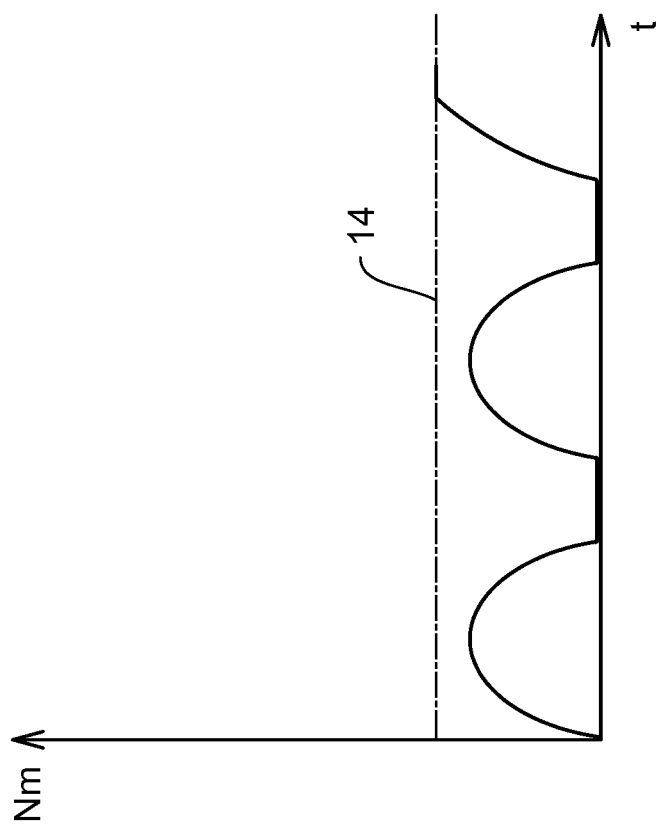
FIG. 3 shows a measurement diagram according to FIG. 2 after determining a new load parameter.

As shown in FIG. 3, new load parameter 14 lies at 110% of measured maximum value 13 of the torque mustered by drive motor 09 during normal operation. In other words, this means that the performance threshold is not exceeded during normal operation when producing packaging 11. Should actual value 12 exceed new load parameter 14 as exemplarily illustrated in FIG. 3, then a warning, an error message or an emergency shutdown signal can be issued. After a corresponding verification by a user, new load parameter 14 is stored in the parameter set allocated to packaging 11 and overwrites old load parameter 10.

The invention claimed is:

1. A method for operating a packaging machine (15) having at least one electric drive motor (09), the drive motor (09) driving at least one functional unit (05) of the packaging machine (15) in a program-controlled manner when producing packaging (11) comprising:
   a) loading a parameter set into a controller of the packaging machine (15), the parameter set containing at least one load parameter (10) which limits the torque or the current consumption of the drive motor (09) to a maximum when producing packaging (11);
   b) operating the packaging machine (15) for producing packaging (11), the maximally occurring actual value (13) of the torque mustered at the drive motor (09) or of the current consumed by the drive motor (09) being measured during operation;
   c) determining a new load parameter (14) as a function of the maximum actual value;
   d) saving the new load parameter (14) in a parameter set allocated to the packaging (11) to be produced.

2. The method according to claim 1, characterized in that the new load parameter (14) is determined after a predetermined minimum number of packaging has been produced.

3. The method according to claim 1, characterized in that the at least one load parameter (13) is automatically overwritten by the new load parameter (14).

4. The method according to claim 1, characterized in that the at least one load parameter (13) is overwritten by the new load parameter (14) after the user has affirmed a corresponding notification.

5. The method according to claim 1, characterized in that the new load parameter (14) is calculated using a linear formula as a function of the maximum actual value (13).

6. The method according to claim 5, characterized in that the new load parameter (14) corresponds to 110% or 120% or 130% or 140% or 150% of the maximum actual value (13).

7. The method according to claim 1, characterized in that a warning is issued upon exceeding a first load parameter during operation of the packaging machine (15).

8. The method according to claim 1, characterized in that an error message is issued upon exceeding a second load parameter during operation of the packaging machine (15).

9. The method according to claim 1, characterized in that an emergency shutdown signal is issued upon exceeding a third load parameter during operation of the packaging machine (15).

* * * * *